United States Patent [19]
Kishida et al.

[11] Patent Number: 6,002,844
[45] Date of Patent: Dec. 14, 1999

[54] BARCODE PRINTING SYSTEM AND ITS CONTROL METHOD

[75] Inventors: Hideaki Kishida, Kawasaki; Katsuo Nakayama, Tokyo; Takefumi Tamura, Tokyo; Kimio Ebata, Tokyo; Seiji Niida, Fussa, all of Japan

[73] Assignee: Canon Aptex Inc., Mitsukaido, Japan

[21] Appl. No.: 08/905,399

[22] Filed: Aug. 4, 1997

[30] Foreign Application Priority Data

Aug. 9, 1996 [JP] Japan ................................... 8-211202
Sep. 19, 1996 [JP] Japan ................................... 8-247986

[51] Int. Cl.⁶ ................................................... G06F 15/00
[52] U.S. Cl. ........................................... 395/114; 235/462
[58] Field of Search ................................... 395/101, 106, 395/109, 111, 112, 113, 114, 117, 185.01, 825; 382/170, 171, 172, 175, 182, 184, 187, 193, 309, 310; 235/462, 463; 358/470, 472, 473, 474

[56] References Cited

U.S. PATENT DOCUMENTS

| | | | |
|---|---|---|---|
| 3,906,203 | 9/1975 | Butulis ..................................... | 235/437 |
| 3,932,840 | 1/1976 | Hanchett ................................. | 235/437 |
| 4,224,508 | 9/1980 | Kao .......................................... | 235/437 |
| 4,251,798 | 2/1981 | Swartz et al. ........................ | 235/462.2 |
| 4,414,468 | 11/1983 | Laurer et al. ........................ | 235/462.07 |
| 4,449,052 | 5/1984 | Krieg ....................................... | 250/568 |
| 4,860,226 | 8/1989 | Martin et al. ............................ | 702/82 |
| 5,336,874 | 8/1994 | Hasegawa ........................... | 235/462.19 |
| 5,489,769 | 2/1996 | Kubo ....................................... | 235/462 |
| 5,521,368 | 5/1996 | Adachi ............................... | 235/462.08 |
| 5,548,110 | 8/1996 | Storch et al. ........................ | 235/462.07 |
| 5,625,721 | 4/1997 | Lopresti et al. ....................... | 382/309 |
| 5,761,219 | 6/1998 | Maltsev ................................ | 371/37.01 |

FOREIGN PATENT DOCUMENTS

| | | |
|---|---|---|
| 0 472 255 | 2/1992 | European Pat. Off. . |
| 5-124313 | 4/1993 | Japan . |
| 5-229542 | 9/1993 | Japan . |
| 6-166192 | 6/1994 | Japan . |
| 6-297739 | 10/1994 | Japan . |
| 7-47670 | 2/1995 | Japan . |
| 7-314808 | 12/1995 | Japan . |
| 82/01163 | 4/1982 | WIPO . |
| 93/03454 | 2/1993 | WIPO . |

*Primary Examiner*—Jerome Grant, II
*Assistant Examiner*—Garbriel I. Garcia
*Attorney, Agent, or Firm*—Fitzpatrick, Cella, Harper & Scinto

[57] ABSTRACT

This invention not only separates printing and barcode checking as independent processes but also simplifies printer processing to allow to print a large number of barcodes at high speed and to satisfactorily check barcodes. For this purpose, when a print control circuit unit (501) receives print information including a barcode, information associated with barcode checking is transmitted to a barcode checker unit (601) prior to printing. Upon actually printing an image including a barcode, when the printed barcode is conveyed to the position of a reader (603) in the barcode checker unit (601), an RD_TRG signal is output to check the printed barcode. Upon reception of this signal, the barcode checker unit (601) reads the printed barcode a plurality of number of times at different positions, and when the normal reading ratio is low, it outputs an error signal to the print control circuit unit (501).

58 Claims, 17 Drawing Sheets

F I G. 16
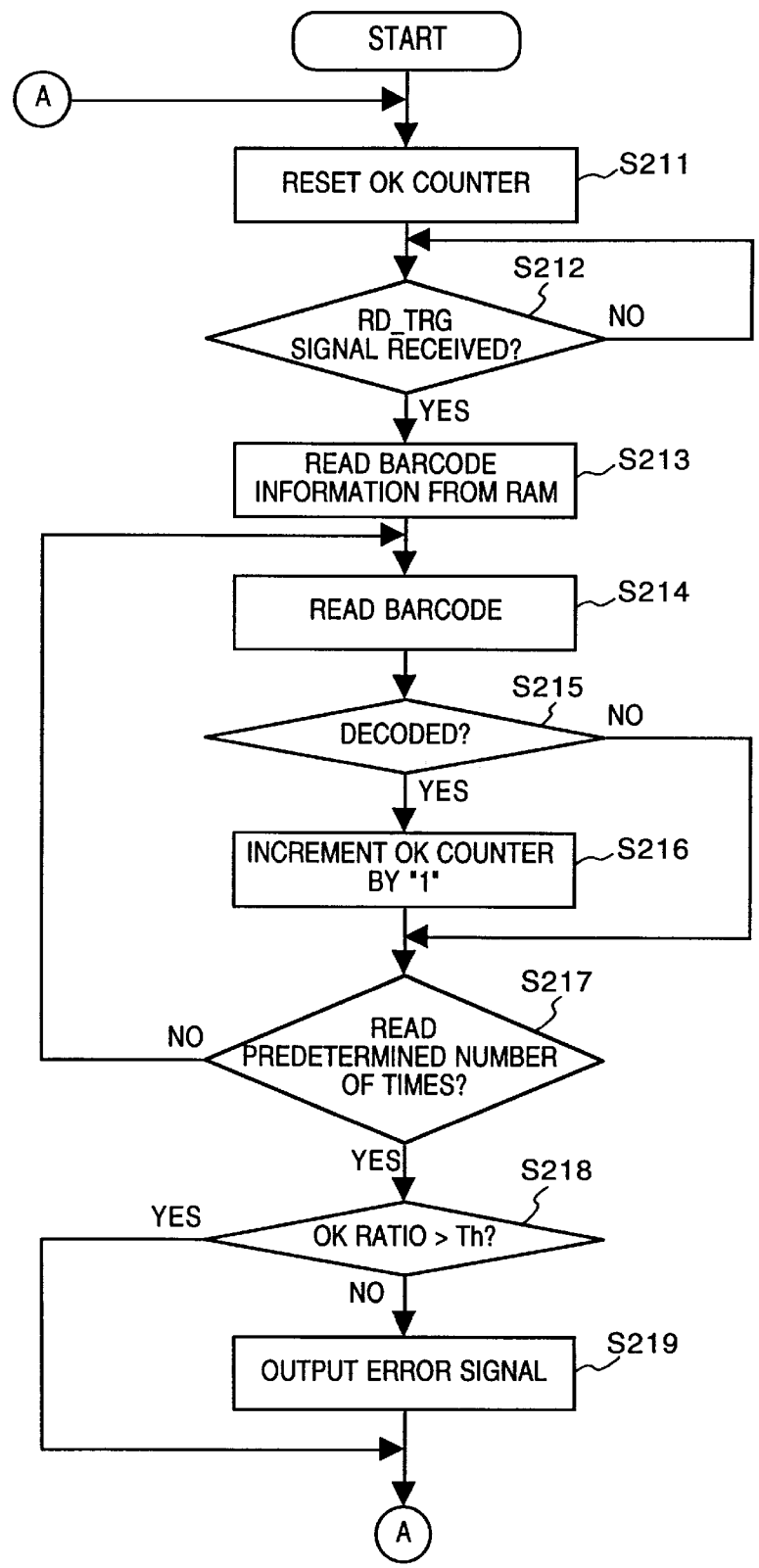

BARCODE PRINTING SYSTEM AND ITS CONTROL METHOD

BACKGROUND OF THE INVENTION

The present invention relates to a barcode printing system and its control method and, more particularly, to a barcode printing system for printing and checking barcodes, and a control method of the system.

Ink-jet printers form ejected inks by various schemes and attach them onto printing media such as recording paper sheets. Among such printers, ink-jet printers that use heat as energy for forming ejected inks have excellent features. That is, a plurality of ejection orifices can be arranged at high density, and such high-density arrangement allows to obtain a high-resolution, high-quality image at high speed and also to easily form a color image.

Of such ink-jet printers, the printers described in Japanese Patent Application Nos. 05-196196 and 06-110097 have a plurality of full-line type ink-jet print heads each having a width equal to that of the printing medium, and are applied to label printers and barcode printers that can obtain high-quality color images at high speed.

Since such printer produces a bubble in ink by heat energy in each ejection orifice, and directly ejects the ink from the ejection orifice of a print head by the pressure of the bubble, it is required to always maintain a stable ejection state of the ink.

However, ejection becomes unstable due to the influences of a bubble present in the ink, dried ink at the ejection orifice, attachment of paper dust onto the surface of the print head, and the like, resulting in non-ejection, mislanding of inks, and the like. In order to suppress non-ejection and mislanding of inks, such apparatus performs ink recovery at predetermined time intervals or exploits an improved recovery means, recovery sequence, and the like.

However, it is impossible to completely prevent non-ejection and mislanding of inks, and the printed image may often deteriorate due to non-ejection or mislanding of inks that occur suddenly.

In particular, when the printed image includes a barcode, print deterioration that does not pose any problem in a normal image may disturb reading of the image using a user's barcode reader.

In order to prevent the above-mentioned problem that the printed barcode cannot be read by the barcode reader, for example, the barcode reader is directly set at the downstream side of the printer convey path to read the printed bar code, after the printed barcode is read, the read barcode data is compared with printed barcode data to check if the barcode is OK/NG, and error processing is done if necessary.

However, in the method of comparing the printed barcode data and the read barcode data using the barcode reader, data transfer, data comparison, and the like between a control circuit of the printer and the barcode reader require much time. For this reason, during checking the barcode, printing must be interrupted or the print speed must be decreased, thus hampering high-speed printing. In order to realize high-speed data communications, a dedicated high-speed IF and the like must be inserted between the barcode reader and the control circuit, and the control circuit itself must use a high-speed CPU, resulting in high cost.

SUMMARY OF THE INVENTION

It is, therefore, an object of the present invention to provide a barcode printing system and its control method, which not only separate printing and barcode checking as independent processes but also simplify printer processing to allow to print a large number of barcodes at high speed and to satisfactorily check barcodes.

In order to achieve the above object, for example, a barcode printing system of the present invention comprises the following arrangement.

That is, a barcode printing system comprises:
- a printing unit for printing a barcode; and
- a checking unit which operates independently of the printing unit and checks the printed barcode,
- the printing unit comprising
  - setting means for setting a condition of a barcode to be printed in the checking unit prior to barcode printing, and
  - control means for performing error processing when a barcode reading error message is received from the checking unit, and
- the checking unit comprising
  - checking means for reading the printed barcode a plurality of number of times from different positions in accordance with information set by the setting means and checking the barcode, and
  - informing means for informing the printing unit of an error when the checking means determines that the barcode is defective.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a flow chart showing the main routine in the barcode checker unit in the third embodiment;

DETAILED DESCRIPTION OF THE PREFERRED EMBODIMENTS

FIRST EMBODIMENT

Figure 1:
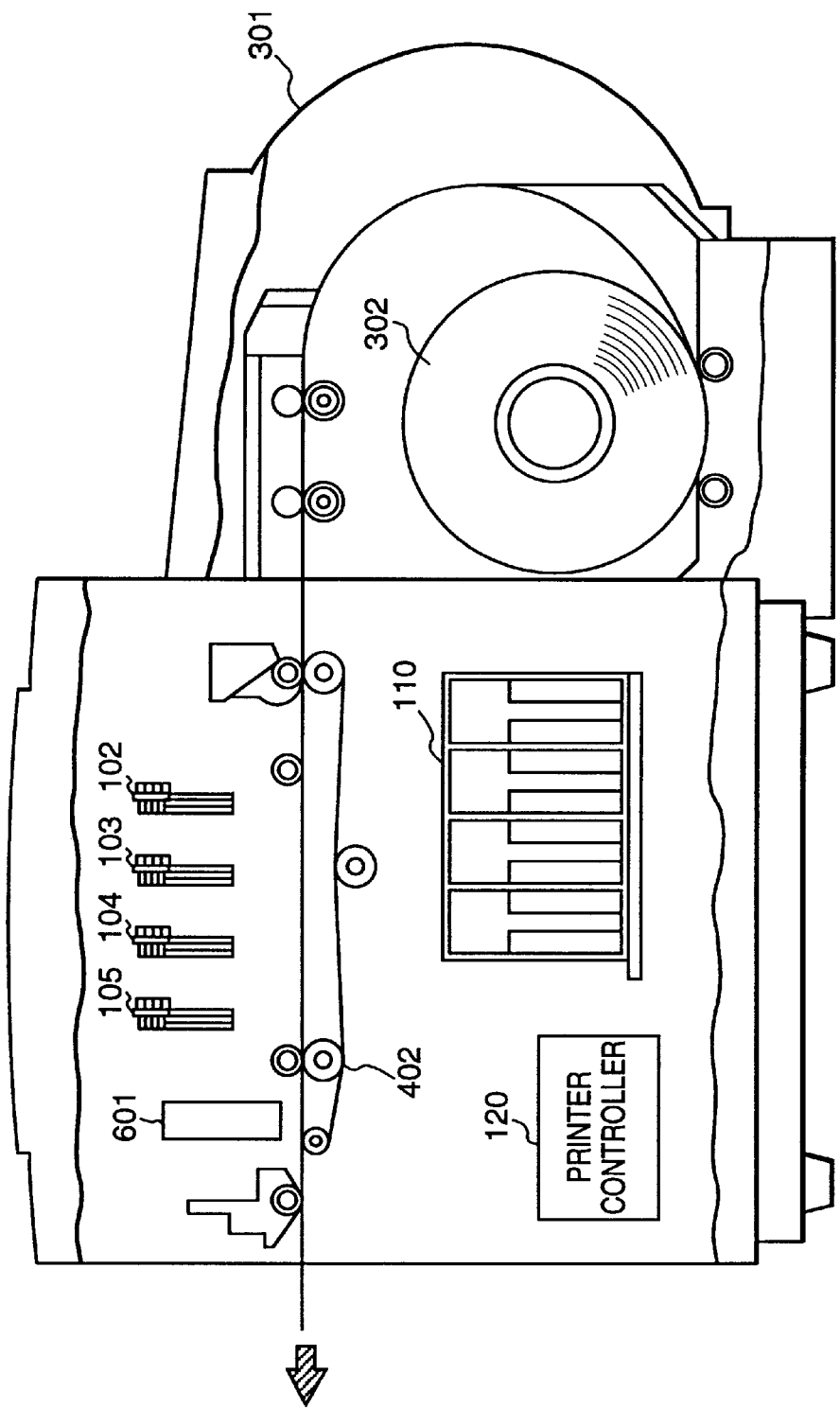
FIG. 1 is a sectional view showing the structure of a barcode printer according to the first embodiment of the present invention.
Figure 2:
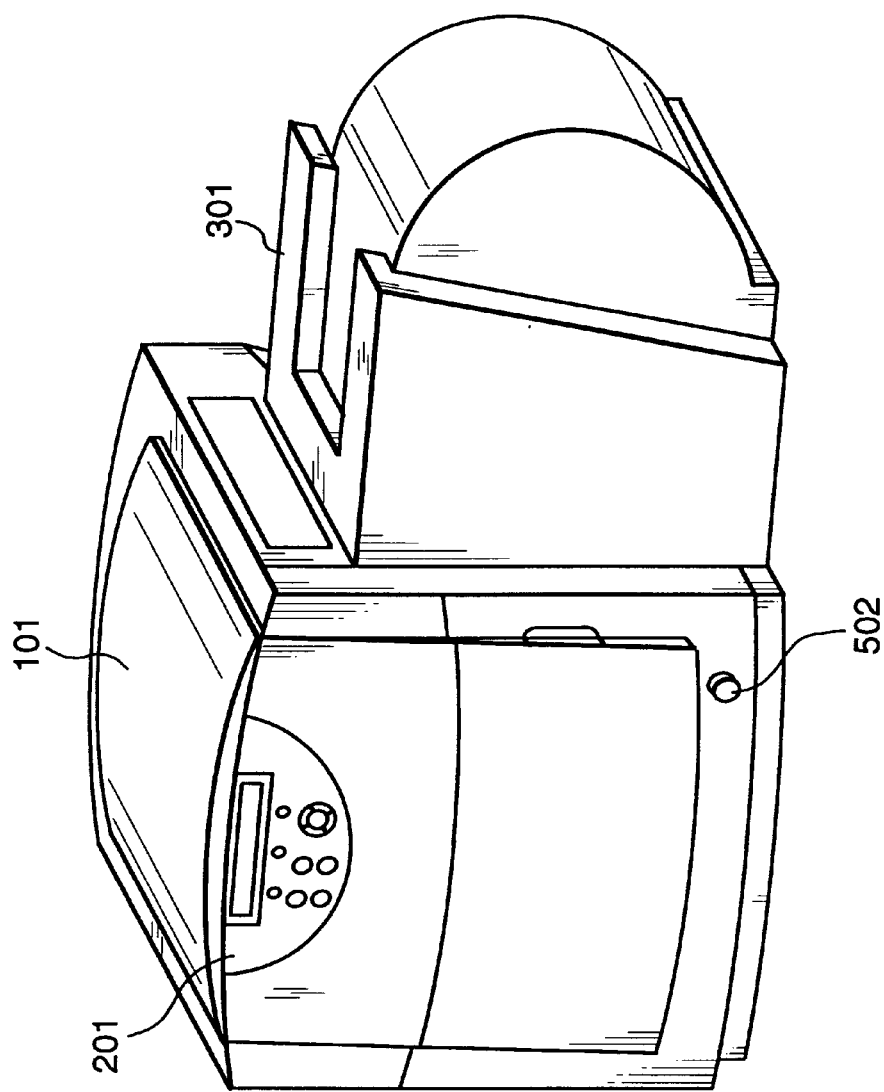
FIG. 2 is a schematic perspective view of the barcode printer in the first embodiment.

FIG. 1 is a sectional view showing the structure of an ink-jet printer of this embodiment, and FIG. 2 is a schematic perspective view of the printer.

Referring to FIGS. 1 and 2, reference numerals 102, 103, 104, and 105 denote full-line type ink-jet print heads each having a length corresponding to the maximum width of the printing medium used. These print heads 102, 103, 104, and 105 respectively eject black, cyan, magenta, and yellow inks from their ejection orifices toward a printing medium 302 at predetermined timings. Upon movement of the printing medium in correspondence with the above-mentioned timings, a color image is printed on the printing medium 302. Reference numeral 120 denotes a printer controller for controlling the overall printer; and 110, an ink tank.

Note that this embodiment exemplifies a roll of continuous label paper as the printing medium 302, and label paper supplied from a roll supply unit 301 is conveyed at a prescribed speed by a convey unit 402 arranged below the print heads. When the image to be printed includes barcode information, a reading unit 601 (to be referred to as a barcode checker unit hereinafter) for reading the printed barcode information and checking if the printed barcode is normal is arranged between the print head 105 and the discharge port of the printing medium.

The barcode checker unit 601 operates independently, and its operation will be described in detail later. Of images to be printed, a barcode is recorded using the black print head 102. In addition, the remaining print heads 103 to 105 and the black print head 102 print a color image on a label sheet adhered on the surface of the printing medium 302.

Figure 3:
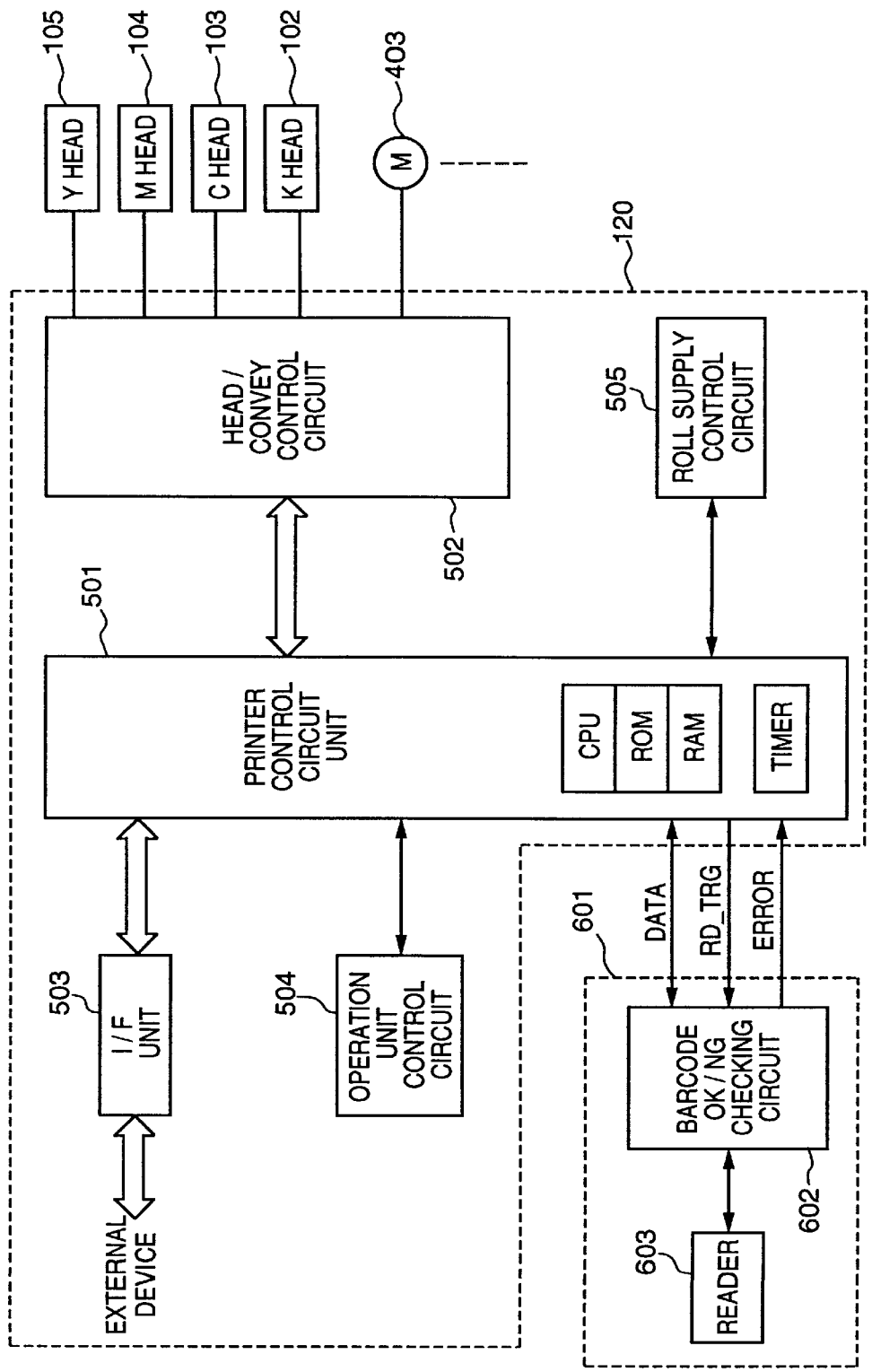
FIG. 3 is a block diagram showing the arrangement of a control system of the barcode printer in the first embodiment.

FIG. 3 is a block diagram of a control system of this embodiment. A print control circuit unit 501 controls an I/F unit 503 for interfacing with an external device, an operation unit control circuit 504, and a roll supply control circuit 505, and also controls overall printing such as processing of a print image, and the like. A head convey control circuit 502 performs ejection control of the plurality of print heads, control of the convey unit, control of a recovery system unit (not shown), and the like.

The barcode checker unit 601 comprises a barcode OK/NG checking circuit 602 and a reader 603, which operate independently, and is connected to the print control circuit unit 501 via lines for a DATA signal for performing serial communications, an RD_TRG signal for instructing the barcode read timing, and an ERROR signal output when the barcode checking result is NG. The reader 603 is a line type reading device constituted by an infrared LED, CCD element, and optical system.

The barcode OK/NG checking circuit 602 comprises a CPU which includes a ROM that stores a program and a RAM used as a work area.

Figure 9:
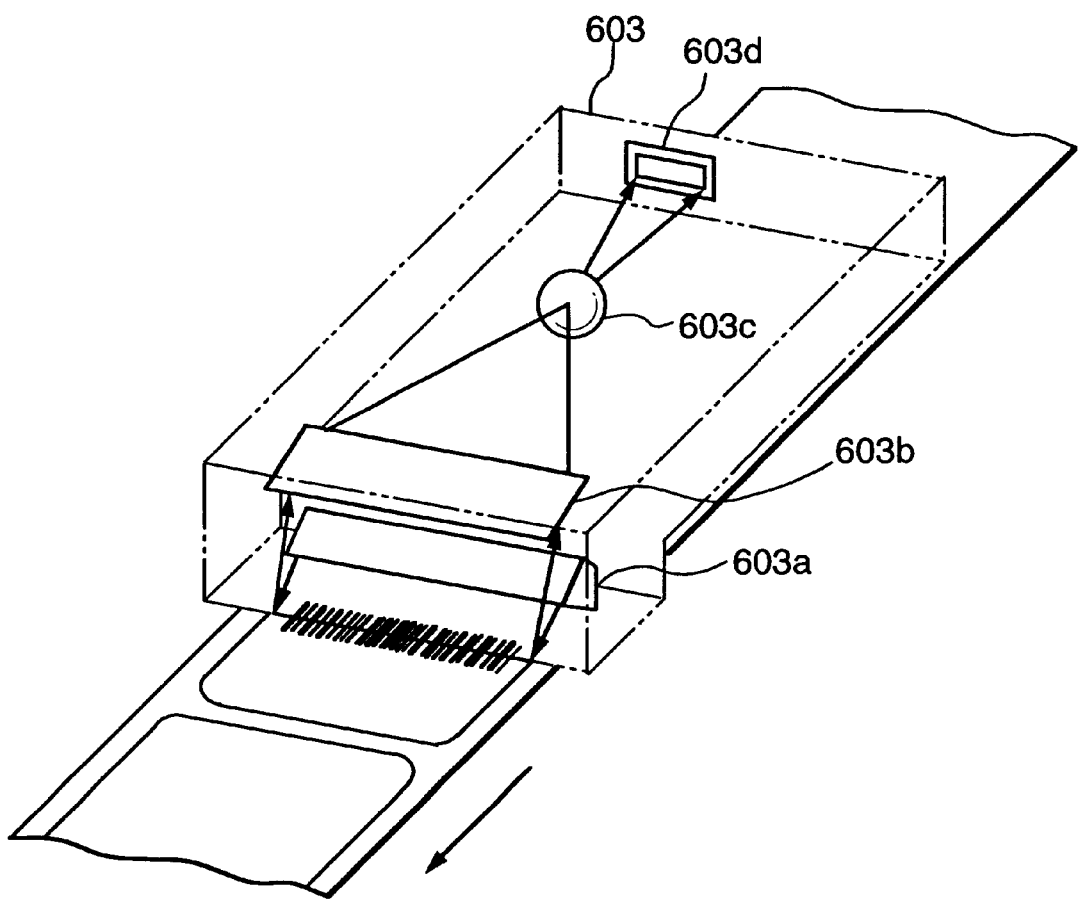
FIG. 9 is a perspective view showing the structure of a reader 603 in the first embodiment.

FIG. 9 is a perspective view of the reader 603 in the barcode checker unit 601 in this embodiment.

Referring to FIG. 9, reference numeral 603a denotes an infrared LED, which has a width equal to that of the label paper to be conveyed. Reference numeral 603b denotes a reflection mirror for reflecting light reflected by the label paper (conveyed in the direction of an arrow in FIG. 9) toward a lens 603c. Reference numeral 603d denotes a line sensor for reading an image for one line formed by the lens 603c.

With the above arrangement, for example, when print data (including a barcode print command and barcode information) is received from a host computer (not shown) connected to the I/F unit 503, the printer prints in accordance with the print data to form copies in number designated by a control command in the print data. At this time, bitmap data, character data, and the like are printed in accordance with a known procedure, and the barcode print command and the barcode information will be described below.

The barcode print command includes some parameters for defining the type, size, position, and the like of the barcode, and bitmap images of corresponding bars are created and printed in accordance with the barcode information that follows the command.

The processing contents of the barcode checker unit 601 and the print control circuit unit 501 in this embodiment will be described below with reference to the flow charts in FIGS. 4 to 7.

The operation processing of the barcode checker unit 601 will be described with reference to the flow chart in FIG. 4. Note that the barcode OK/NG checking circuit 602 in the barcode checker unit 601 comprises a controller (microprocessor and the like), a ROM that stores the operation procedure of the controller, and a RAM for storing an OK counter to be described below. In the following description, assume that various initial data have been loaded and set from the print control circuit unit 501.

The initial data include the type of barcode to be printed, the number of barcodes printed on a single line, the number of times of reading a single barcode and a reading OK ratio, and a value used when the barcode is read and is normally decoded.

In step S1, the OK counter is reset. In step S2, it is checked if an RD_TRG signal as a barcode reading start signal is received from the print control circuit unit 501.

If it is detected that this signal is received, the flow advances to step S3, and the reader 603 reads a barcode. It is checked in step S4 if the barcode is normally read and decoded and if the decoded value is equal to the value supplied from the print control circuit unit 501. If YES in step S4, the flow advances to step S5 to increment the contents of the OK counter by "1". Thereafter, the flow advances to step S6.

In step S6, it is checked if the barcode has been read a predetermined number m of times. If NO in step S6, the flow returns to step S3 and the operations for reading a barcode and checking if the barcode is normally read and decoded are repeated.

Figure 8:
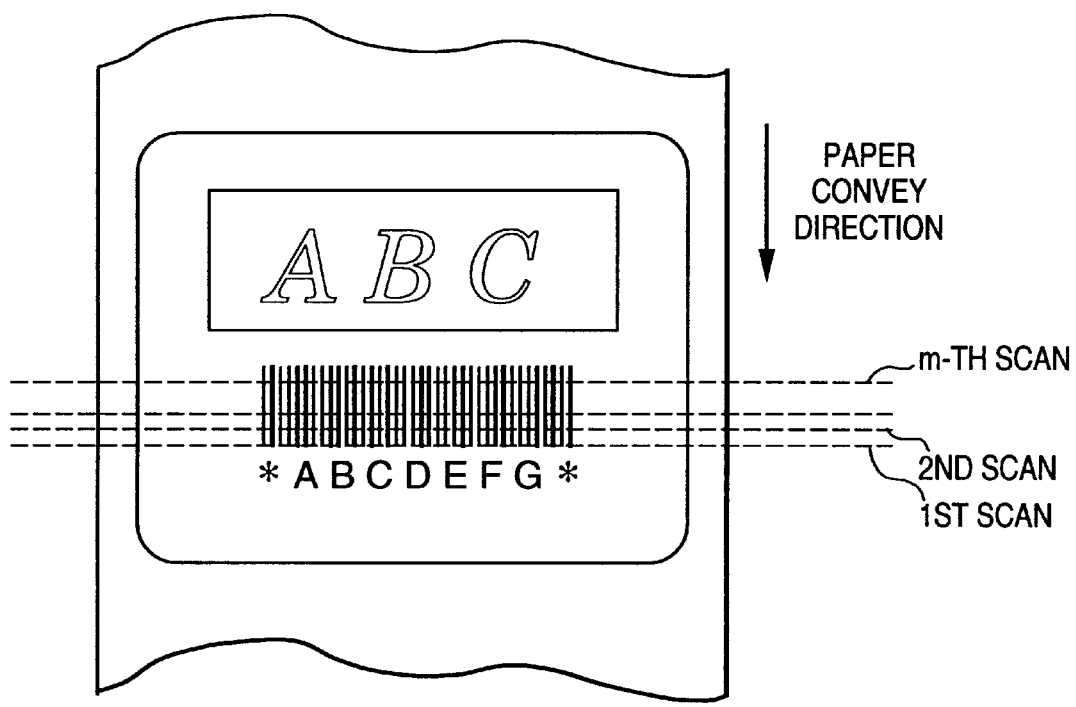
FIG. 8 shows the relationship between the number of times of reading and the reading position of the barcode checker in the first embodiment.

During reading of a barcode, since the printing medium is conveyed at constant speed, the reader consequently reads a single barcode while crossing it at different positions, as shown in FIG. 8. That is, the barcode reader can be fixed in position.

Upon completion of the m reading operations, the number of normally read barcodes is set in the OK counter. In step S7, it is checked if the OK ratio (=value of OK counter/m) is larger than a predetermined threshold value Th. If YES in step S7, the flow returns to step S1 to prepare for reading of the next barcode. On the other hand, if NO in step S7, this means that the print control circuit unit 501 located at the upstream side is not normally printing, and an error signal is sent to the print control circuit unit 501 via the ERROR signal line shown in FIG. 3.

Note that the number m of times of reading of a single barcode becomes a maximum of 16 when, for example, the print speed is 150 mm/s, the height of the barcode to be printed is 5 mm, and the reading speed of the reader 603 is 500 scans/s. Of course, the number m of times of reading of the barcode can be arbitrarily set within the range defined by the print speed, the height of the barcode to be printed, and the reading speed. Also, the number m of times of reading of the barcode can be changed in correspondence with the height of the bar code.

The operation processing procedure of the print control circuit unit 501 will be explained below. The print control circuit unit 501 has a microprocessor (CPU), a ROM that stores the operation processing procedure of the CPU, a RAM used as a work area, and N timers for counting clocks (not shown), as shown in FIG. 3, as in the barcode OK/NG checking circuit 602. Note that "N" represents the number of label sheets that can be present between the black print head 102 and the barcode checker unit 601.

When the timer has counted a predetermined number of clocks and when an error signal is received from the barcode checker unit 601 located at the downstream side, the corresponding interrupt processing operations are executed.

Figure 5:
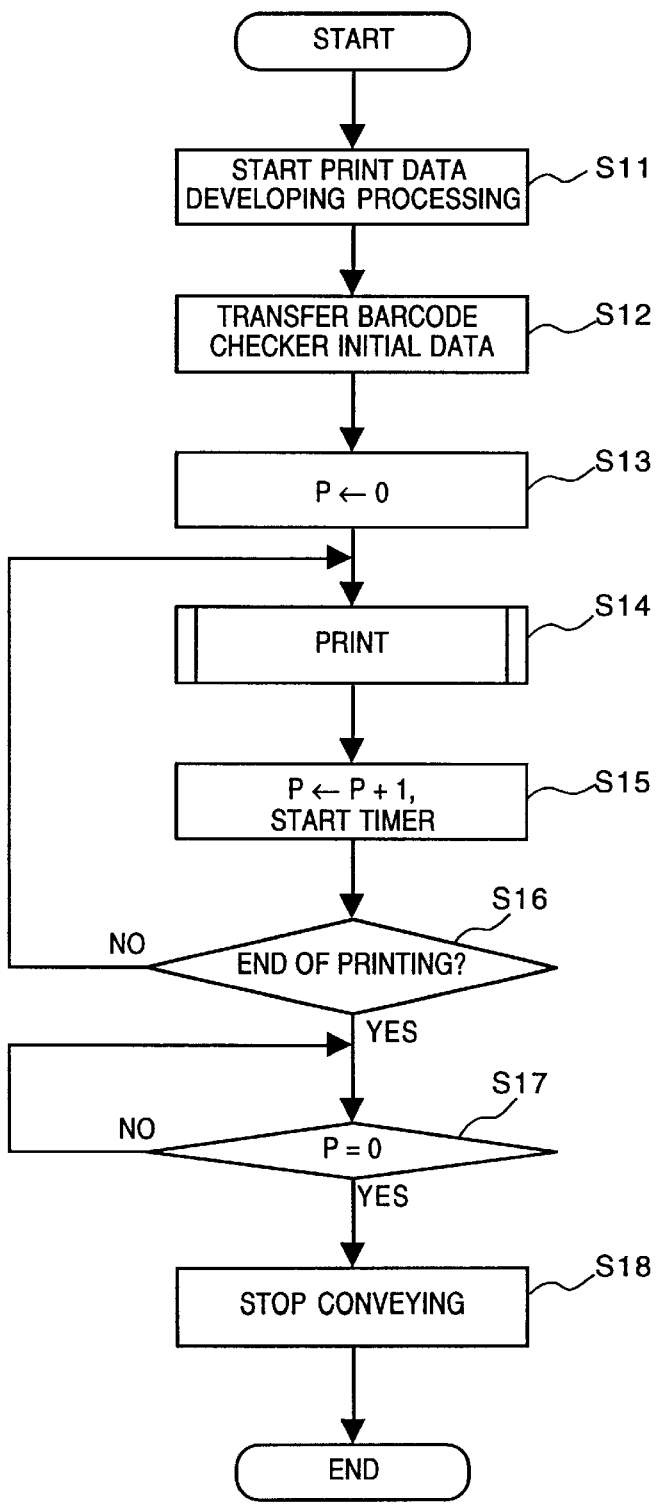
FIG. 5 is a flow chart showing the processing procedure of the main routine of a print control circuit unit in the first embodiment.
Figure 6:
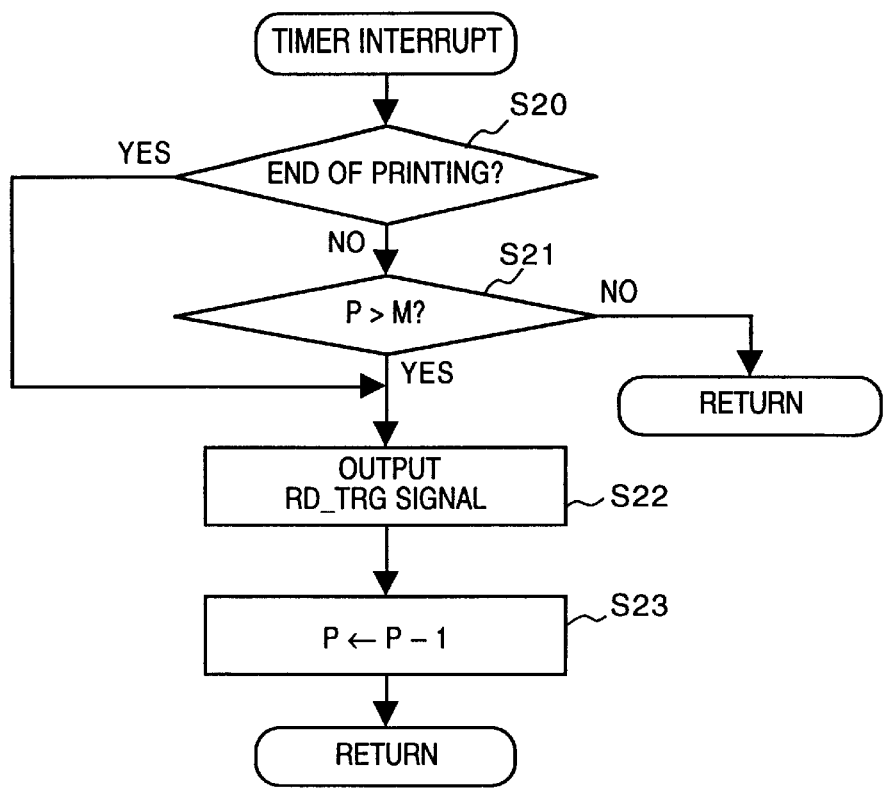
FIG. 6 is a flow chart showing the timer interrupt processing procedure of the print control circuit unit in the first embodiment.
Figure 7:
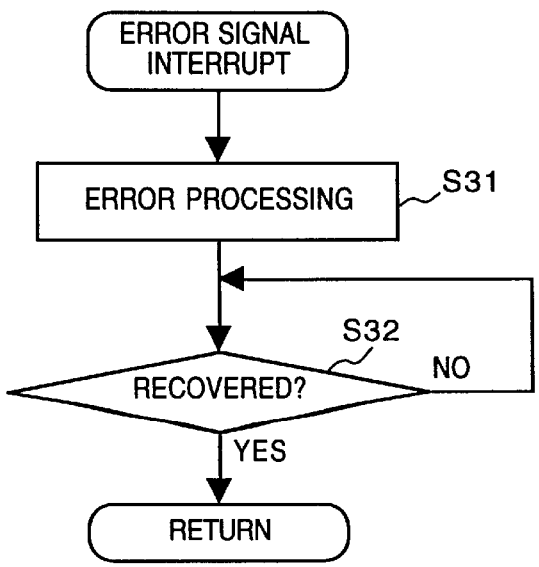
FIG. 7 is a flow chart showing the error interrupt processing procedure of the print control circuit unit in the first embodiment.

FIG. 5 shows the main routine of the print control circuit unit 501, FIG. 6 shows the interrupt processing from the timer, and FIG. 7 shows the interrupt processing upon reception of the error signal.

The main routine shown in FIG. 5 will be explained below.

When a print instruction of a print image including a barcode is issued, developing processing of print data is started in the print control circuit unit 501 (step S11). During this processing, the print control circuit unit 501 transfers initial data for the barcode checker unit 601 including the type and value of the barcode to be printed, the number of barcodes to be printed on a single line, the number of times of reading of a single barcode and OK ratio, and the value to be obtained upon decoding, and the like, to the barcode checker unit 601 via the serial DATA signal line (step S12). Thereafter, a variable P is reset to "0" (step S13). After all the print pre-processing steps are completed, the label paper begins to be conveyed to start printing (step S14).

The variable P herein has the following meaning.

Assuming that a barcode is printed in black color alone using the print head 102, a certain time period is required until the barcode printed by an actual print head reaches the reading position of the barcode checker unit 601. In other words, during this time period, a plurality of printed barcodes are present, and the initially printed barcode reaches the reading position of the barcode checker unit 601 after a plurality of barcodes are printed on the printing medium. More simply, the RD_TRG signal must not be output to the barcode checker unit 601 until the initially printed barcode reaches the barcode checker unit 601. The variable P is used for the purpose of achieving this control.

Upon completion of printing one barcode, the flow advances to step S15 to increment the variable P by "1". In addition, one of the timers is selected and started.

Thereafter, the processing in step S14 and the subsequent steps is repeated until it is determined that printing of a pre-set number of copies is complete.

If it is determined that printing has been completed, the control waits in step S17 until the variable P becomes "0". If the variable P becomes "0", driving of the convey system is stopped in step S18 to end a series of processing operations.

The selected timer starts counting of clocks in step S15. When the count of the timer has reached a pre-set value, it outputs an interrupt signal to the internal CPU of the print control circuit unit 501.

This pre-set value corresponds to a time required until the printing medium printed with a barcode is conveyed to the reading position of the barcode checker unit 601 at the next timing.

Upon reception of this interrupt signal, the CPU executes the timer interrupt processing corresponding to the flow chart in FIG. 6.

More specifically, it is checked in step S20 if printing has been completed. If NO in step S20, the flow advances to step S21 to check if the value of the variable P is larger than a predetermined value M. The predetermined value M indicates the number of printed label sheets that can be present between the print head and the barcode checker unit 601.

If it is determined in step S21 that the variable P≦M, the printed barcode is not conveyed yet to the position of the barcode checker unit 601, thus ending this processing.

On the other hand, if it is determined in step S21 that the variable P>M, since this indicates that the reading timing of the printed barcode has been reached, an RD_TRG signal is output to the barcode checker unit 601 in step S22 to check the barcode by the above-mentioned method. Thereafter, the variable P is decremented by "1" to end this processing.

Note that step S20 is required since unchecked label sheets still remain before the position of the barcode checker unit at the timing of completion of printing. That is, barcode checking continues until the variable P becomes "0", and the processing ends upon completion of checking of all the barcodes.

As described above, printing and checking of barcodes are independently executed by separate devices, and the above-mentioned processing continues as long as barcodes are normally printed.

However, as described above, when barcodes are not normally printed due to, e.g., non-ejection of the head, the barcode checker unit 601 outputs an error signal.

Upon reception of the error signal, the print control circuit unit 501 executes the error signal interrupt processing shown in FIG. 7.

In step S31, a warning indicating that errors have occurred is produced externally (e.g., by driving a buzzer or the like), and appropriate error processing such as stopping of printing (also stopping conveying of the printing medium), circulation of ink, wiping of the print head surface, and the like, is executed. If it is determined that a series of error recovery processing operations have been completed (step S32), this processing ends. Note that the error recovery processing can be mechanically automated to some extent, but often requires manual operations when, for example, the head must be exchanged. For this reason, the warning indicating errors is produced.

This embodiment adopts the heads that eject inks by bubbles produced by heat energy. Since the print head of this type can easily realize a higher resolution and a high print speed, it is convenient for printing barcodes. However, as the number of times of driving per unit time increases, the temperature of nozzles in the print head is likely to increase as well as the number of ejected inks. Hence, barcode lines become thicker after printing for a long period of time, and the barcode checker unit consequently determines errors. In such situation, the number of times of driving per unit time can be decreased. That is, the control for decreasing the convey speed of the printing medium can be performed.

In the above description, a single barcode is printed on one printing medium for the sake of simplicity. However, in practice, a plurality of barcodes are normally printed on a single printing medium.

In this case, the RD_TRG signal is kept output while one printed printing medium is passing the reader of the barcode checker unit, and OK/NG checking is performed after all the printed barcodes are read and checked. Alternatively, every time the printed barcode has reached the reading position, reading, checking, and OK/NG checking are done.

In the above description, the threshold value Th as the OK/NG checking criterion of barcode reading is set in accordance with an instruction from the print control circuit unit 501. However, this value may be fixed, or the print control circuit unit 501 may set this value in accordance with a predetermined command and its parameter in print data supplied from a print data generation source. Alternatively, this value may be set by an operation panel (not shown).

Furthermore, the line sensor is used as the barcode reader. Alternatively, a laser scan type reader can be used, needless to say. Such reader will be described in the second embodiment.

In this embodiment, the processing in the print control circuit unit 501 is realized by interrupt processing. However, the processing of the unit 501 can also be realized by a series of processing operations. Hence, the processing of the unit 501 is not limited to specific processing, but may be modified within the scope of the above embodiment.

As described above, according to this embodiment, since data communications required for barcode checking is ended before the beginning of printing, and an NG signal is output during printing only when it is determined that the printed barcode is NG, appropriate barcode checking can be attained without decreasing the print speed. Since the reading OK ratio can be arbitrarily set and barcode checking can be performed in correspondence with each customer's barcode reader, the barcode checking level required by the customer can be set.

Also, not only the unit for printing and the unit for checking barcodes are merely separated, but also the processing at the printing unit side is simplified to print a large number of barcodes at high speed and to attain satisfactory barcode checking.

SECOND EMBODIMENT

In the first embodiment, a barcode is read by the line sensor in the reader 603. The second embodiment will exemplify a case wherein a barcode is read by scanning a laser beam onto a barcode portion by exposure and detecting light randomly reflected by the barcode portion.

Figure 10:
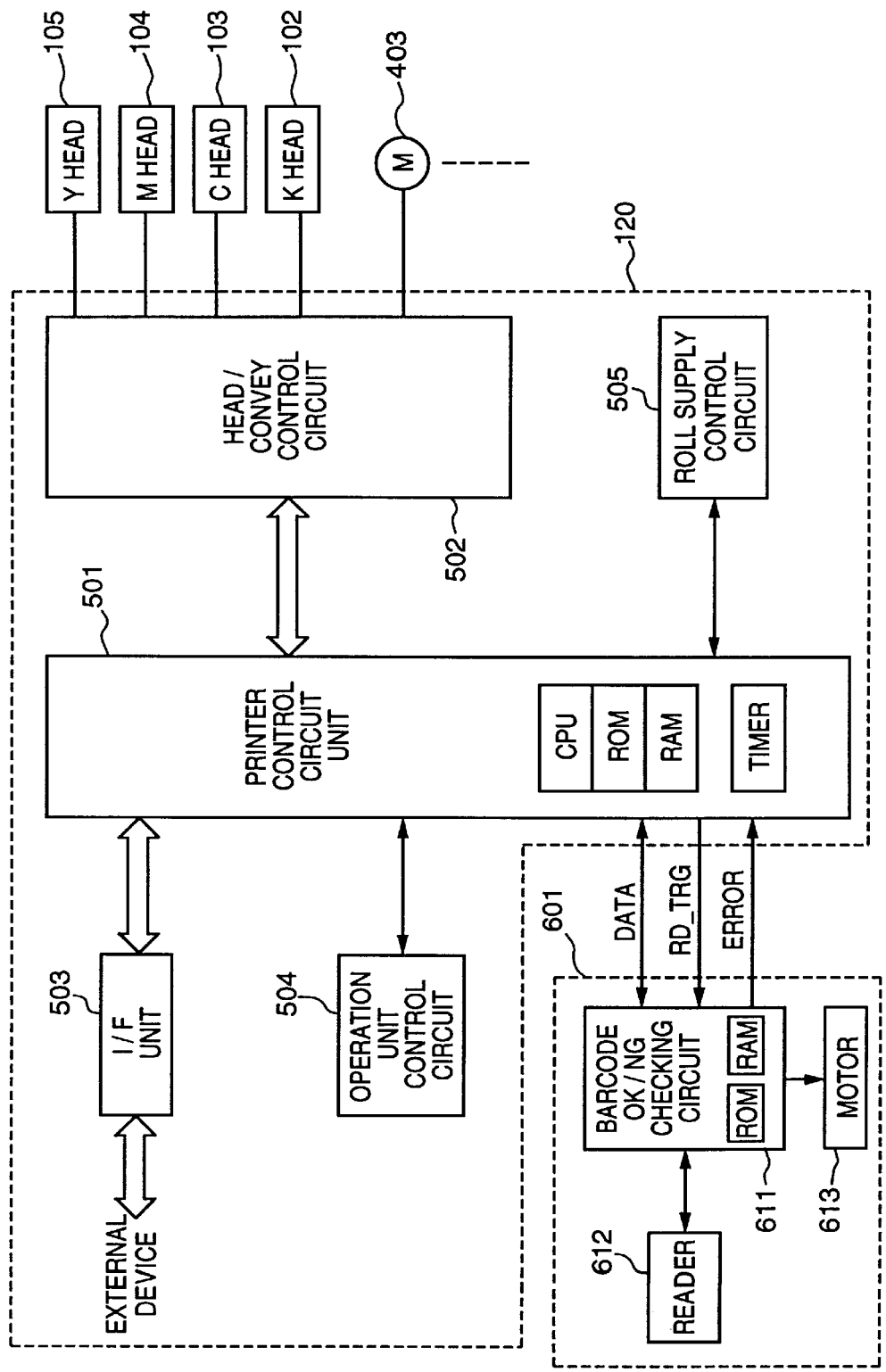
FIG. 10 is a block diagram showing a control system of a barcode printer according to the second embodiment of the present invention.

FIG. 10 is a block diagram showing a control system in the second embodiment. The difference from FIG. 3 is the arrangement of a barcode checker unit. In FIG. 10, reference numeral 601 denotes a barcode checker unit in the second embodiment. The barcode checker unit 601 operates independently as in the first embodiment. Reference numeral 611 denotes a barcode OK/NG checking circuit; and 612, a reader. The basic functions of the barcode OK/NG checking circuit 611 and the reader 612 are the same as those in the first embodiment. Reference numeral 613 denotes a motor for adjusting the reading angle of the reader 612.

Figure 11:
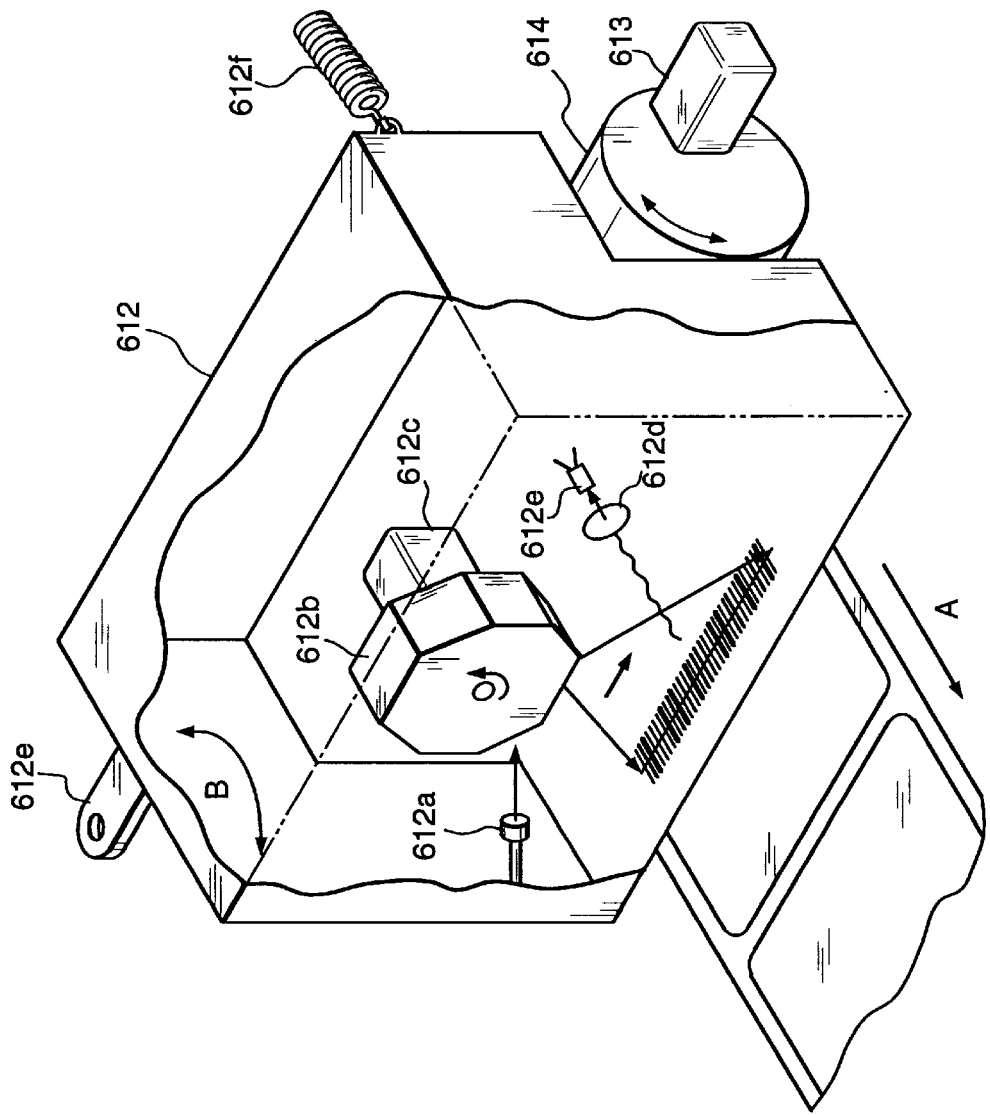
FIG. 11 is a perspective view showing the structure of a reader 612 in the second embodiment.

FIG. 11 shows the arrangement of the reader 612 and that around the motor 613. FIG. 11 is a perspective view of the reader 11 which is stored in a single housing in practice.

The reader 612 is constituted by a laser light-emitting element 612*a*, a polygonal mirror 612*b*, a motor 612*c* for rotating the polygonal mirror 612*b* at constant speed, a lens 612*d* for imaging light reflected by the reading surface (label), and a light-receiving element 612*e*. An arm 612*e* is fixed to the housing of the reader 612, as shown in FIG. 11, and is also fixed to the inner portion of the printer to be pivotal about a portion in the vicinity of the distal end of the arm 612*e* as a fulcrum. One end of a coil spring 612*f* is connected to the housing on the side opposite to the arm 612*e*, and the other end thereof is connected to a predetermined position inside the printer. With this arrangement, the reader 612 contacts the side surface of an eccentric cam 614 fixed to the rotation shaft of the motor 613 at a predetermined pressure.

When the motor 613 is pivoted by an appropriate angle, the eccentric cam 614 pivots, and the reader 612 pivots along an arrow B to have the fulcrum as the center. As a result, the scanning direction of a laser spot that exposes a barcode can be changed.

The number m of times of reading of a single barcode described in the first embodiment will be examined below.

Note that the number m of times of reading is calculated to be a maximum of "3" when, for example, the convey speed of a printing medium 302 is 150 mm/s, the minimum height of the barcode to be printed is 5 mm, and the laser scan speed of the reader 612 is 100 scans/s. However, since the laser scan (scanning of the laser beam spot from the left to the right in FIG. 11) requires a predetermined period of time, a barcode is obliquely read by the above-mentioned reading mechanism, and the reading range by the last scan falls outside the barcode. For this reason, the number of times of reading in practice becomes "2".

Originally, since the reliability of the OK ratio as a criterion for checking if a barcode is normally recorded can become higher as the number of times of reading is larger, a larger number of times of reading is preferably set.

Figure 12:
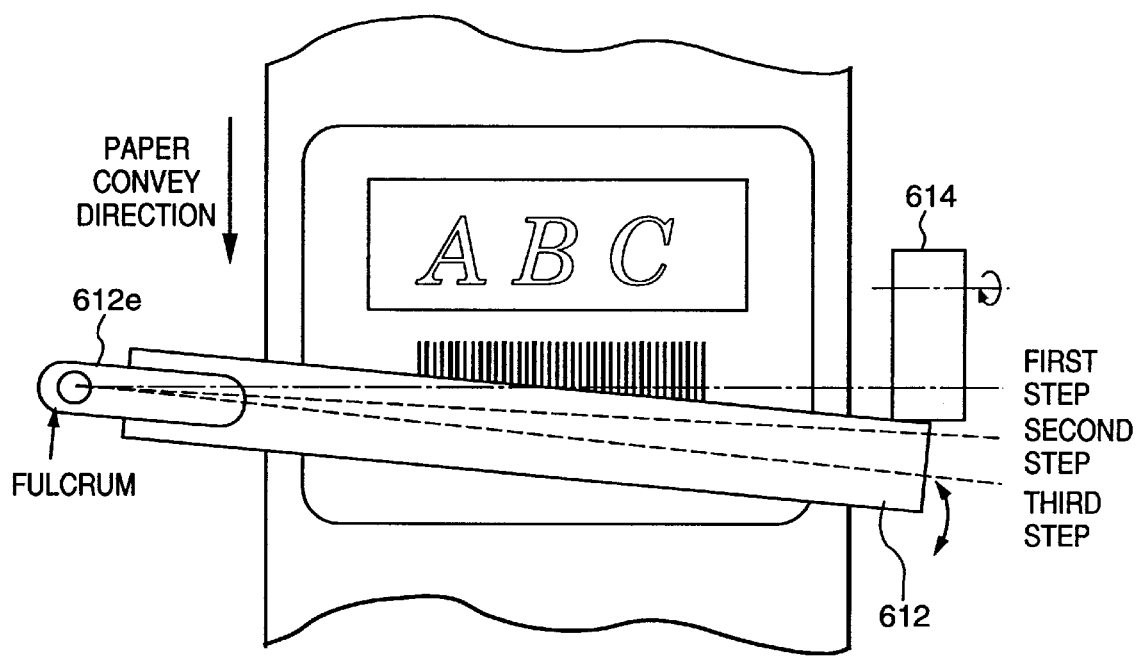
FIG. 12 is a view for explaining the operation of the reader 612 in the second embodiment.

In this situation, in the second embodiment, the laser beam is scanned from the left to the right in FIG. 11. In this case, in order to increase the number of times of reading, the reader 612 is pivoted about the fulcrum of the arm 612*e*, as shown in FIG. 12. In FIG. 12, reference numeral 614 denotes an eccentric cam (the cam which has a rotation central shaft at an eccentric position), which is rotated by the motor 613 via the rotation shaft of the motor 613 or some gears. The reader 612 is always biased by the spring 612*f* in a direction to contact the cam 614.

As a result, when the cam 614 is pivoted, the reading direction of the reader 612 can be changed like the first step, second step, third step, . . . in FIG. 12 depending on the pivot angle of the cam 614. This angle is set in accordance with the convey speed of the printing medium 302 and the angle determined in accordance with the convey speed and the scanning speed of the laser beam. The number of times of reading is determined based on the convey speed, the scanning speed of the laser beam (the number of scans per unit time), and the minimum height of a barcode.

With the above arrangement, even when a barcode reader which scans a laser beam by exposure at a relatively low speed is used, the number of times of reading can be maximized, and the reliability of the barcode checker unit 601 can be improved.

Note that a print control circuit unit 501 in the second embodiment calculates the reading angle on the basis of the convey speed of label paper and the height of the barcode to be recorded, and transfers initial data including the calculated angle to the barcode checker unit 601 of the second embodiment, in the processing shown in FIG. 12.

Figure 13:
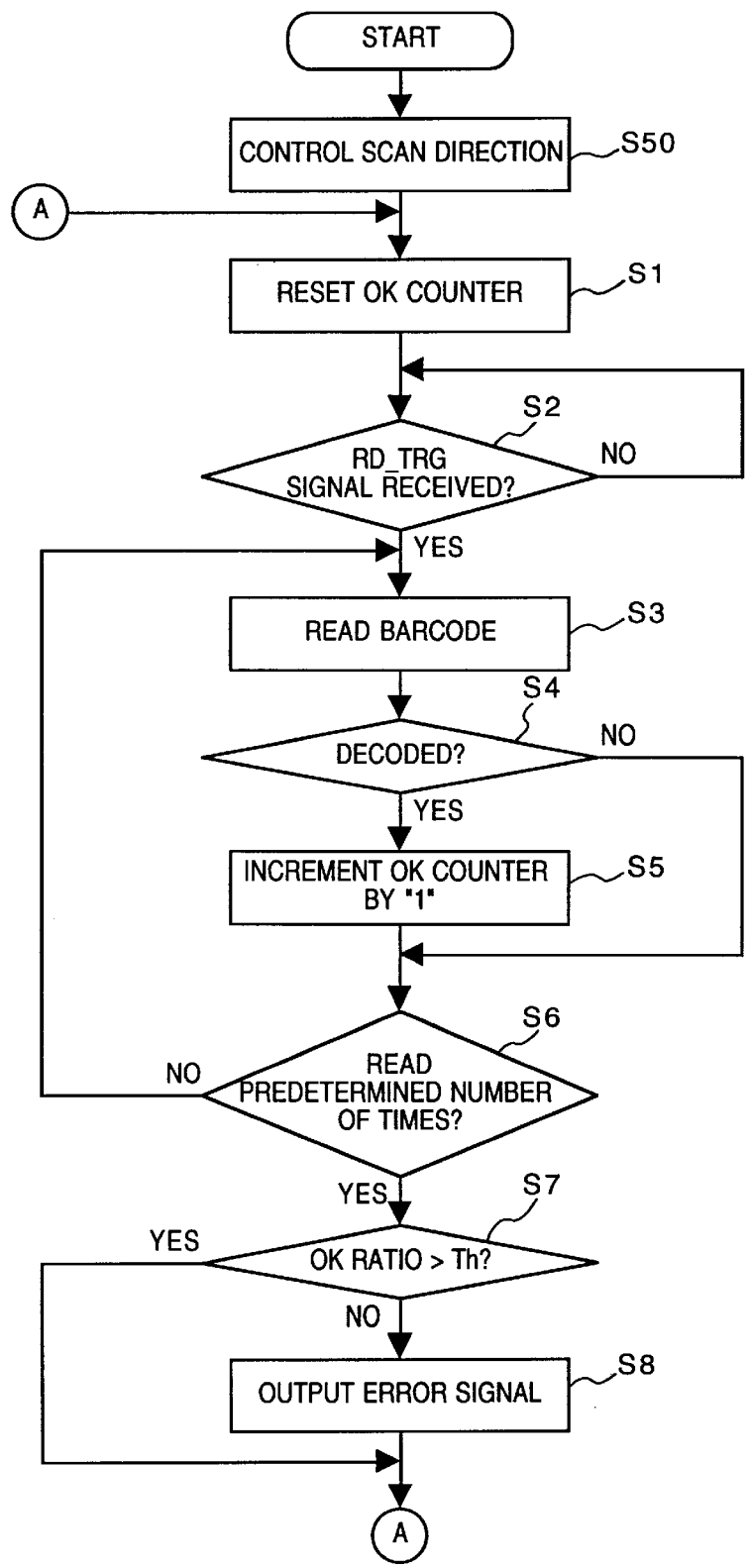
FIG. 13 is a flow chart showing the processing contents of a barcode checker unit in the second embodiment.

The barcode checker unit 601 drives the motor 613 in accordance with the reading angle in the initial data transferred from the print control circuit unit 501, and sets the scanning direction of the laser beam in a direction perpendicular to the convey direction of the label paper. Only this processing is added to that in the first embodiment. For this purpose, step S50 shown in FIG. 13 is added to the flow chart in FIG. 4. In step S50, the motor 613 is driven in accordance with the convey speed of the label paper in setting information transferred from the print control circuit unit 501, and is stopped at the predetermined position.

Figure 4:
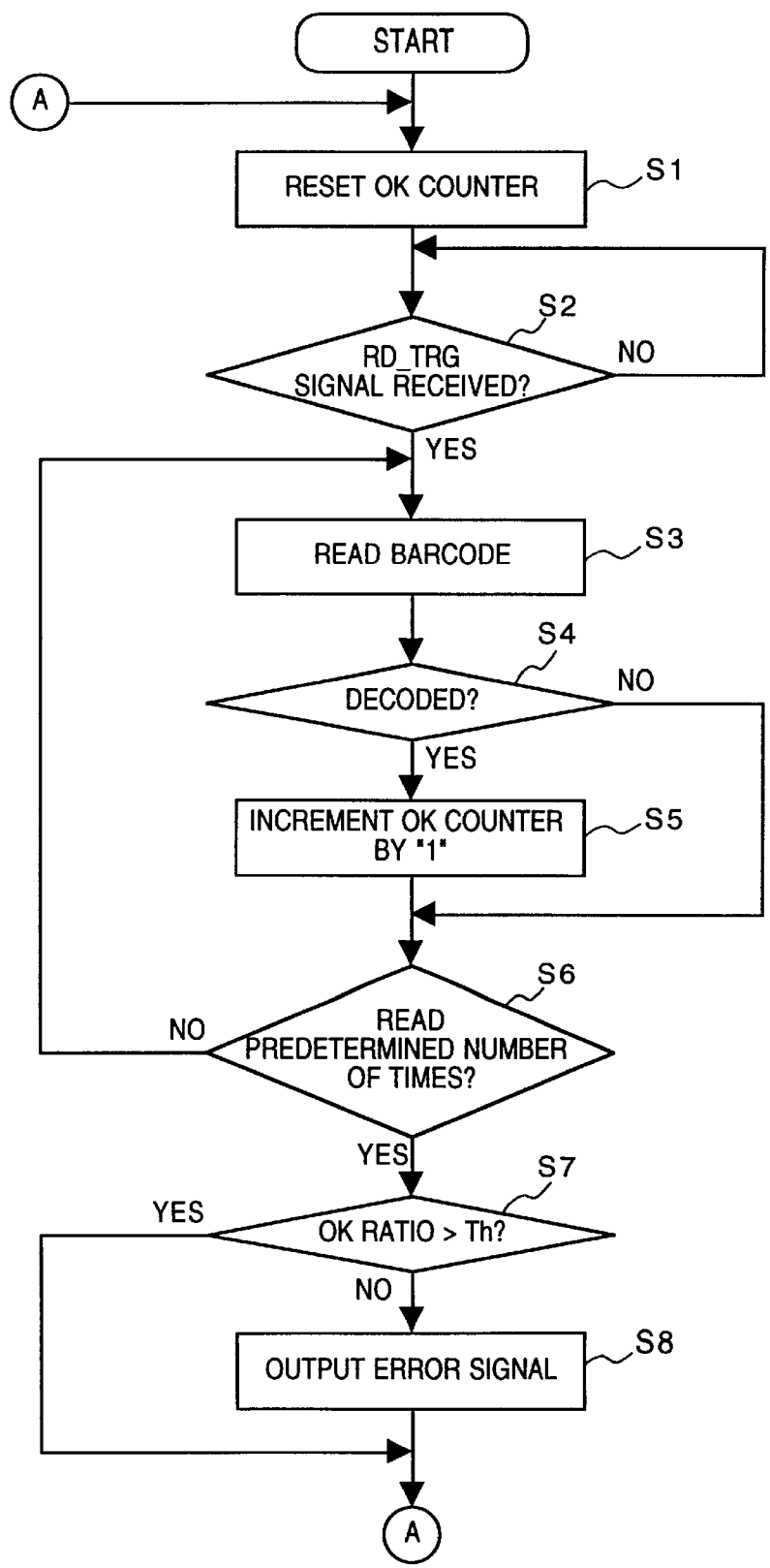
FIG. 4 is a flow chart showing the processing procedure of a barcode checker in the first embodiment.

Note that the processing other than step S50 in FIG. 13 is the same as that in FIG. 4, and a detailed description thereof will be omitted. Also, the processing on the print control circuit unit 501 side is also the same as that in the first embodiment, and a detailed description thereof will be omitted.

In the second embodiment as well, a single barcode is printed on one printing medium for the sake of simplicity. However, in practice, a plurality of barcodes are normally printed on a single printing medium.

In this case, the RD_TRG signal is kept output while one printed printing medium is passing the reader of the barcode checker unit, and OK/NG checking is performed after all the printed barcodes are read and checked. Alternatively, every time a printed barcode has reached the reading position, reading, checking, and OK/NG checking are done.

In the above description, the threshold value Th as the OK/NG checking criterion of barcode reading is set in accordance with an instruction from the print control circuit unit 501. However, this value may be fixed, or the print control circuit unit 501 may set this value in accordance with a predetermined command and its parameter in print data supplied from a print data generation source. Alternatively, this value may be set by an operation panel (not shown).

Furthermore, the barcode reader reads a barcode by scanning a laser beam. However, other schemes may be used.

In the second embodiment, the reading angle of the reader 612 in the barcode checker unit is calculated by the print control circuit unit 501 (under the assumption that the reading speed of the reader 612 is known), and the calculated information is sent to the barcode checker unit. Alternatively, parameters required for calculating the angle may be input to the barcode checker unit, and the angle may be determined by the barcode checker unit to drive the motor.

The same applies to the number of times of reading. Since the number of times of reading can be calculated if the convey speed of the printing medium 302, the reading speed (the number of scans per unit time) of the reader 612, and the minimum height of the barcode are known, it can be calculated by the barcode checker side.

Furthermore, the second embodiment uses the motor 613 as the means for changing the direction of the reader 612. For example, a solenoid or any other means may be used.

As described above, with the second embodiment as well, the same effect as in the first embodiment can be expected.

That is, according to the second embodiment, since data communications required for barcode checking are ended before the beginning of printing, and an NG signal is output during printing only when it is determined that the printed barcode is NG, appropriate barcode checking can be attained without decreasing the print speed. Since the reading OK ratio can be arbitrarily set and barcode checking can be performed in correspondence with each customer's barcode reader, the barcode checking level required by the customer can be set.

Also, not only the unit for printing and the unit for checking barcodes are merely separated, but also the processing at the printing unit side is simplified to print a large number of barcodes at high speed and to attain satisfactory barcode checking.

THIRD EMBODIMENT

In the first and second embodiments described above, a plurality of copies of an identical barcode are printed. In the third embodiment, different barcodes are printed, and their authenticities are checked.

For the sake of simplicity, assume that the barcode checker unit has the same structure as that of the first embodiment. Also, assume that the arrangements of the image print control circuit unit 501 and the barcode checker unit 601 are the same as those shown in FIG. 3. The operation processing contents of the image print control circuit unit 501 and the barcode OK/NG checking circuit 602 will be explained below with reference to FIGS. 14 to 16.

Figure 14:
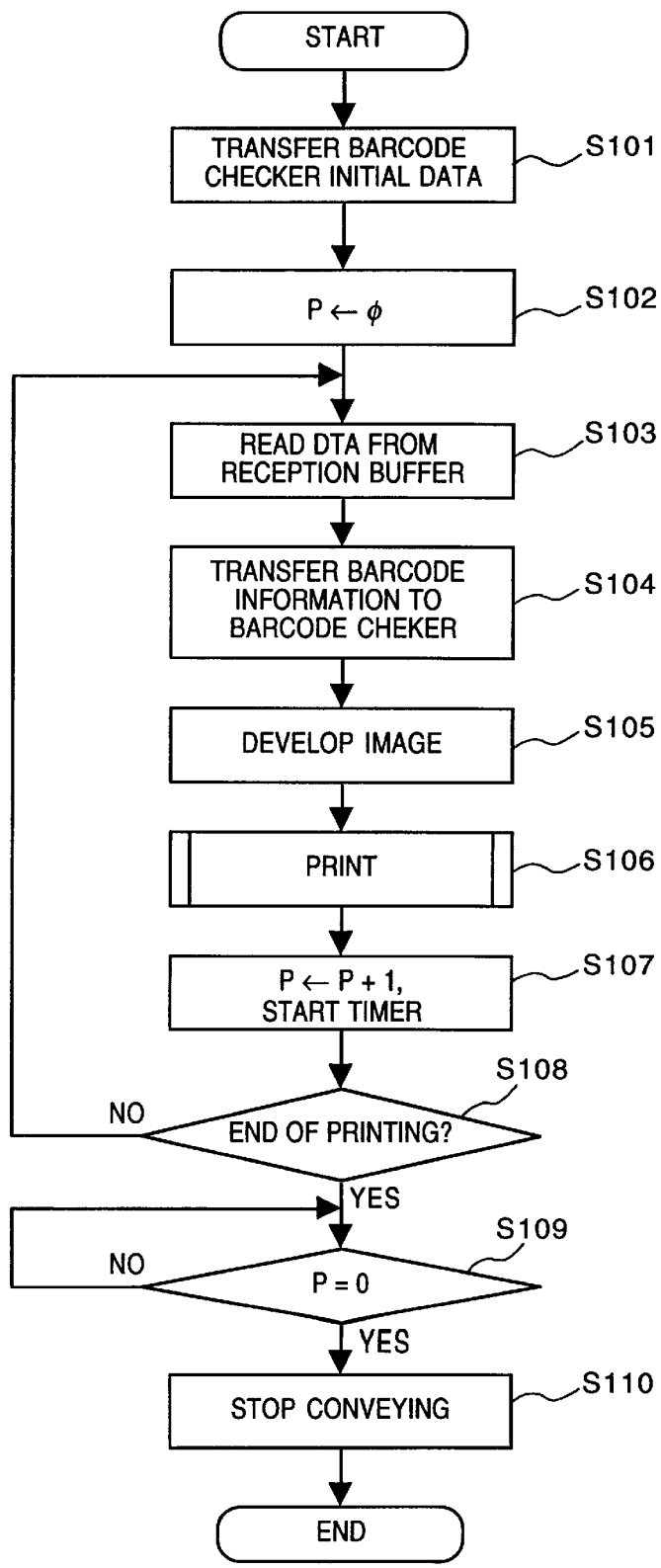
FIG. 14 is a flow chart showing the processing contents of a print control circuit 501 in the third embodiment of the present invention.

The operation processing of the image print control circuit unit 501 will be described below with reference to FIG. 14. Note that the image print control circuit unit 501 performs processing for storing data latched by the I/F unit 503 in a reception buffer area in its internal RAM in accordance with an interrupt signal from the I/F unit 503 when data is transferred from an external device to the I/F unit 503.

In step S101, data stored in the reception buffer is analyzed, and the analysis result is transferred to the barcode checker unit 601 as initial data. The initial data includes the convey speed of the printing medium, and the like. The flow advances to step S102, and a variable P is initialized to "0". In step S103, the data to be printed on the label is read out from the reception buffer. If the readout data includes a command associated with barcode printing, a value obtained by decoding that barcode, the print position of the barcode, and the height information of the barcode are transferred to the barcode checker unit 601 in step S104. The flow then advances to step S105, and a print image is developed on the RAM on the basis of the readout data. The image is printed in step S106.

Upon completion of printing on a single label sheet, the flow advances to step S107 to increment the variable P by "1" and to start a timer. Note that a plurality of timers are used as in the first embodiment.

When the flow reaches step S108, it is checked if an end of printing is instructed. An end of printing is instructed when a command indicating this is received from the external device or when such command is input from an operation panel.

If NO in step S108, the flow returns to step S103 to read out data to be printed on the next label.

The processing in step S109 and the subsequent steps is the same as that in step S17 and the subsequent steps in FIG. 5, and a detailed description thereof will be omitted.

The processing executed upon reception of an interrupt signal from one of the timers and the processing upon reception of an error signal from the barcode checker unit 601 are the same as those shown in FIGS. 6 and 7 of the first embodiment, and a detailed description thereof will be omitted.

Figure 15:
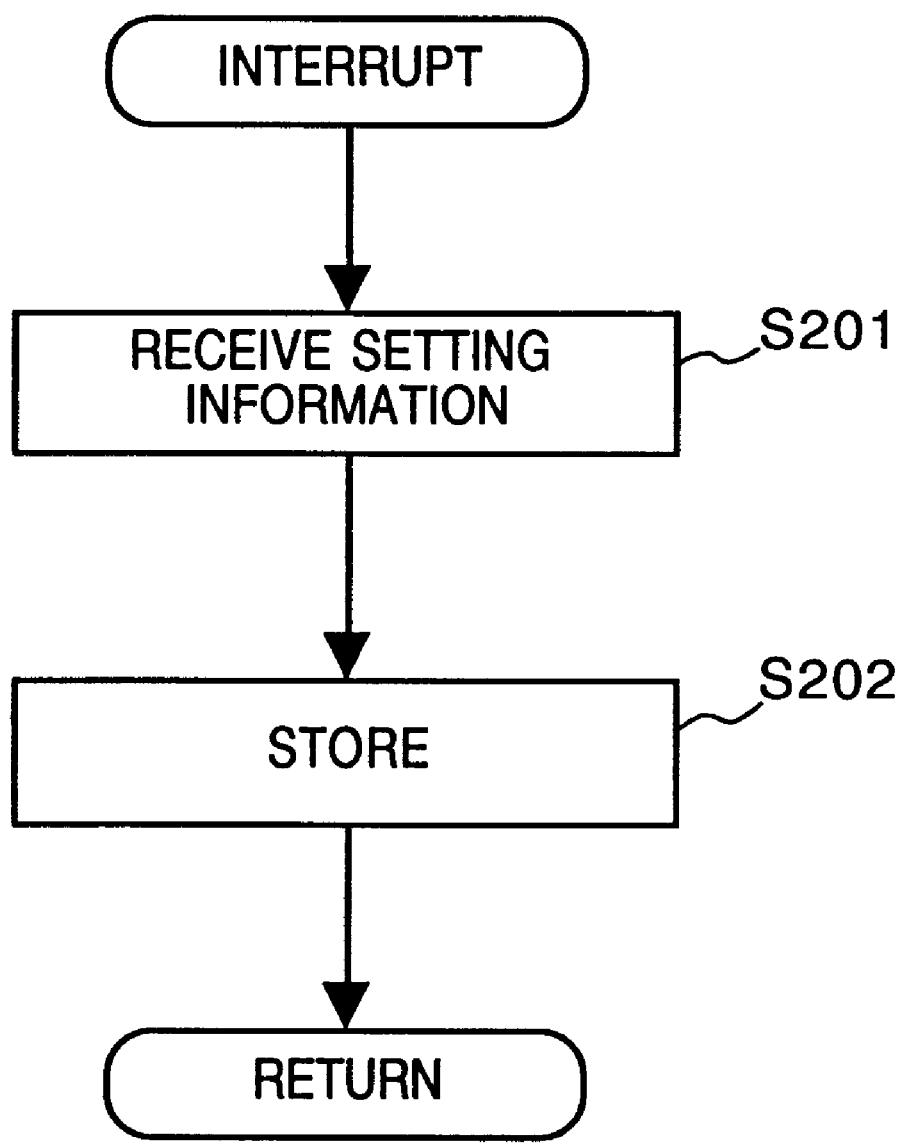
FIG. 15 is a flow chart showing the interrupt processing in a barcode checker unit in the third embodiment.

The operation processing of the barcode checker unit 601 will be described below. FIG. 15 shows the interrupt processing executed when the barcode OK/NG checking circuit 602 in the barcode checker unit 601 receives barcode information from the image print control circuit unit 501.

Upon reception of barcode information (including a value obtained upon decoding the barcode, and information indicating the print position and height of the barcode) from the image print control circuit unit 501, the barcode OK/NG checking circuit 602 receives that information in step S201 in its interrupt processing. The flow advances to step S202, and the received barcode is stored in the RAM. Note that the RAM in the barcode OK/NG checking circuit 602 can store a plurality of pieces of barcode information. In practice, the RAM need only store barcode information corresponding in number to the label sheets present between the print head 102 that prints the barcodes and the barcode checker unit 601. However, if N barcodes are printed on a single label, the RAM must have an N-fold capacity.

FIG. 16 shows the main routine of the barcode OK/NG checking circuit 602.

In step S211, the OK counter is reset. In step S212, the control waits until a reading start signal RD_TRG signal is received from the image print control circuit unit 501. Upon reception of the reading start signal RD_TRG, the flow advances to step S213, and the oldest one of a plurality of pieces of unprocessed barcode information stored in the RAM is read out.

The subsequent steps S214 and S219 are the same as steps S3 to S8 in FIG. 4. In step S215, however, it is checked if the barcode is normally read (decoded) and if the value obtained by decoding the read barcode matches the barcode value read out from the RAM.

With the above-mentioned processing, according to the third embodiment, an image including different barcodes can be printed on a label in addition to the effects of the first embodiment.

Note that the description of the third embodiment is given based on the first embodiment, but may be given based on the second embodiment. Hence, the third embodiment does not limit the present invention in any way.

FOURTH EMBODIMENT

In the first to third embodiments described above, the barcode reading timing of the barcode checker unit is defined using the RD_TRG signal from the print control circuit unit 501. The fourth embodiment to be described below can obviate the need for this RD_TRG signal.

Figure 17:
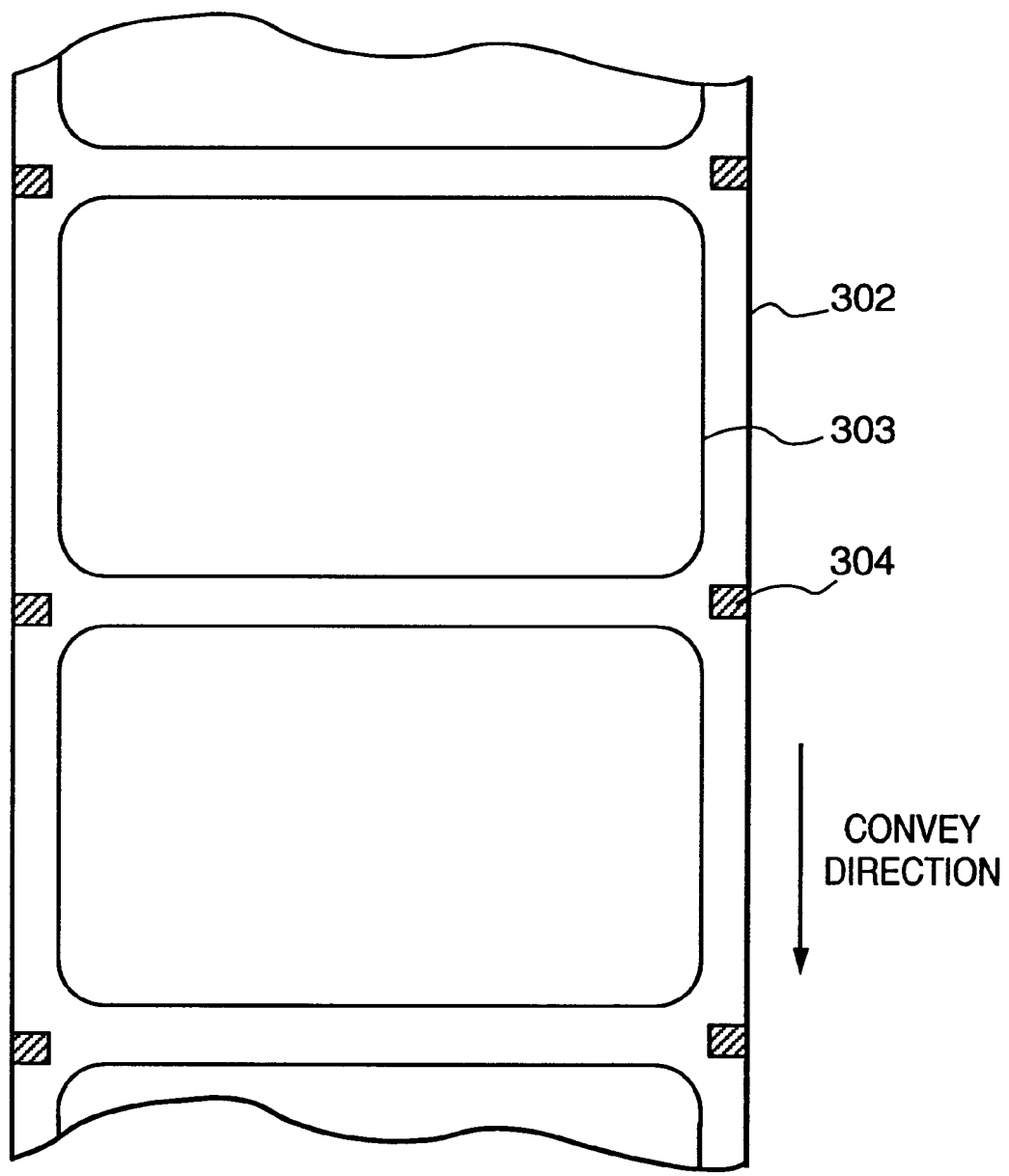
FIG. 17 shows a printing medium in the fourth embodiment of the present invention.

FIG. 17 shows a printing medium 302 in the fourth embodiment. As shown in FIG. 17, the printing medium 302 has label sheets 303, as in the first to third embodiments, and also has marks 304 used for determining the print position of each label sheet 303.

The image print control circuit 501 and the barcode checker unit 601 respectively have means (e.g., light-receiving elements) for detecting these marks. When a barcode is printed on the label sheet 303, the image print control circuit unit 501 calculates the print position of the barcode as coordinate data relative to the mark detection positions, and transfers it to the barcode checker unit 601 as a part of barcode information.

When the mark detection means detects marks, the barcode checker unit 601 determines that a barcode is present at the coordinate position transferred from the image print control circuit unit 501, and can read the barcode at a predetermined timing. That is, in the previously described processing of the barcode checker unit 601, the processing for checking if an RD_TRG signal is received can be replaced by the processing for checking if marks are detected.

Figure 18:
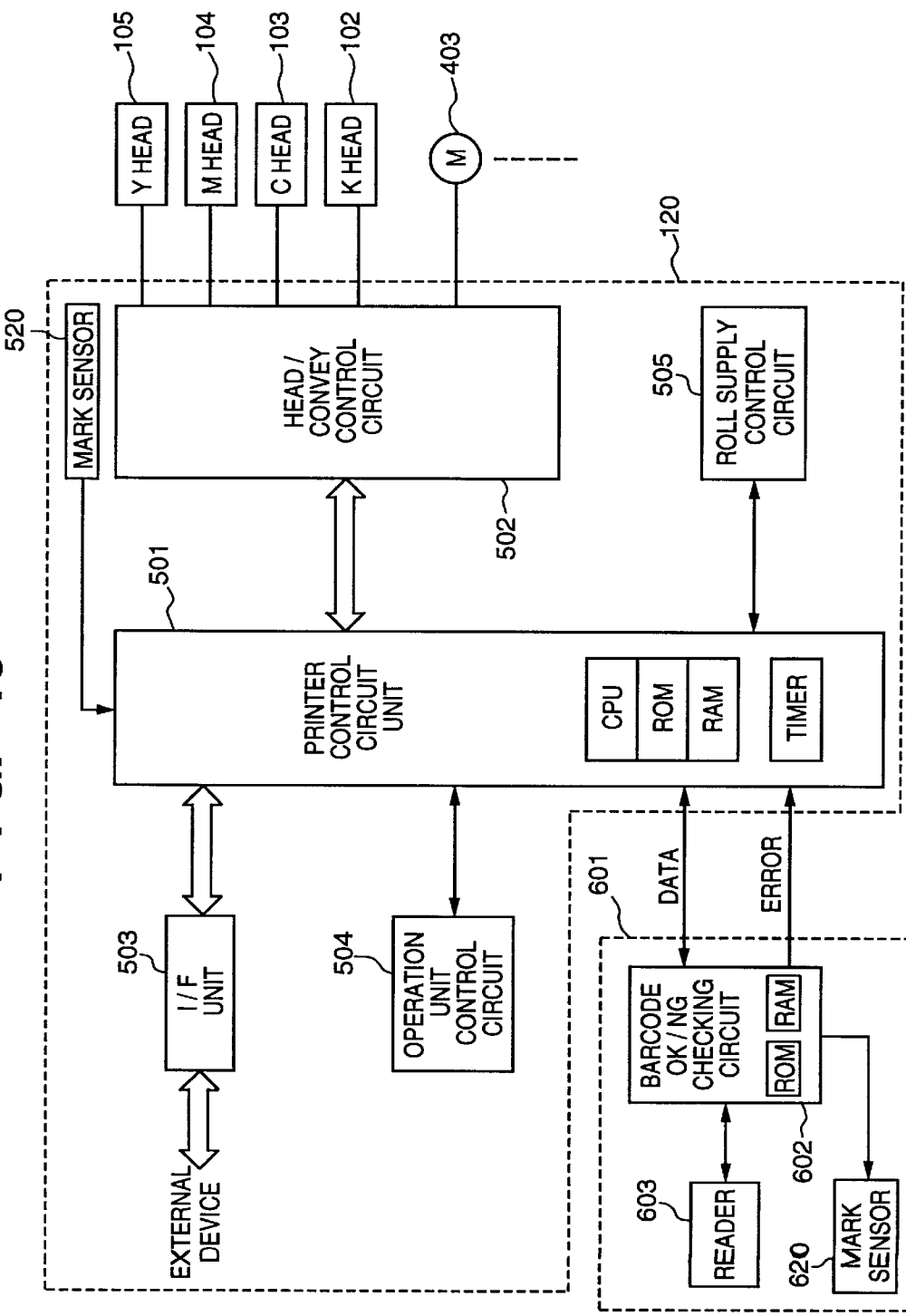
FIG. 18 is a block diagram showing a control system of a barcode printer of the fourth embodiment.

In this case, the block arrangement of the apparatus of this embodiment is as shown in FIG. 18. As shown in FIG. 18, a mark sensor 520 is connected to the print control circuit unit 501, and a mark sensor 620 is also connected to the barcode OK/NG checking circuit 602.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A barcode printing system comprising:
   a printing unit for printing a barcode; and
   a checking unit which operates independently of said printing unit and checks the printed barcode,
   said printing unit comprising:
   a print head for printing an image on a recording medium;
   print control means for, on a basis of inputted barcode data, controlling said print head so as to print a barcode image on the recording medium; and control means for performing error processing in a case where an error signal is received from said checking unit, and said checking unit comprising:

reading means for reading optically the barcode image printed on the recording medium;

checking means for reading the printed barcode a plurality of number of times by said reading means and checking the printed condition of the barcode on the basis of the result by decoding the barcodes read the plurality of times; and informing means for outputting the error signal to said printing unit when said checking means determines that the printed condition of the barcode is defective.

2. The system according to claim 1, wherein said print head in said printing unit comprises a head for ejecting ink.

3. The system according to claim 2, wherein said print head comprises a head for ejecting ink by heat energy.

4. The system according to claim 1, further comprising:

conveying means for conveying the recording medium, wherein said print head having a length corresponding to a width of a printing medium, and prints a barcode in a direction perpendicular to the convey direction of the printing medium, and said reading means in said checking unit reads the barcode in the direction perpendicular to the convey direction of the printing medium.

5. The system according to claim 1, wherein said checking means in said checking unit checks the barcode by checking if a barcode normal reading ratio with respect to the number of times of reading is not less than a predetermined value.

6. The system according to claim 1, wherein said printing unit includes transmitting means for transmitting information related to a barcode to be printed to said checking unit.

7. The system according to claim 6, wherein said information includes at least one of the type of barcode to be printed, the number of barcodes, or a value obtained when the barcode is decoded normally.

8. The system according to claim 6, wherein said printing unit further comprises setting means for setting information used for checking the barcode, wherein said transmitting means transmits information set by said setting means to said checking unit.

9. The system according to claim 8, wherein the information set by said setting means includes the number of reading times by said checking unit.

10. The system according to claim 9, wherein said checking means determines that the printed condition is defective if a ratio with respect to the number of times of reading is less than a predetermined value.

11. The system according to claim 10, wherein said setting means sets information said ratio used for checking the printed condition of the barcode.

12. The system according to claim 8, wherein the information set by said setting means includes the number of times of reading in said checking unit.

13. The system according to claim 1, wherein said checking means determines that the printed condition of the barcode is effective if a ratio with respect to the number of times of reading is larger than a predetermined value.

14. The system according to claim 1, wherein said printing unit and said checking unit are enclosed in a body.

15. A method of controlling a barcode printing system, which comprises:

a printing step for printing a barcode; and a checking step which operates independently of said printing unit and checks the printed barcode, said printing step comprising:

a print step for printing an image on a recording medium along a conveyor;

a print control unit for, on the basis of inputted barcode data, controlling said print step so as to print a barcode image on the recording medium; and a control step of performing error processing in a case where an error signal is received from said checking unit, and said checking step comprising:

a reading step of reading optically the barcode image printed on the recording medium wherein, in the reading step, the printed barcode is read a plurality of number of times;

determining the printed condition of the barcode on a basis of a result by decoding the barcodes read the plurality of times; and an informing step of outputting an error signal to said printing unit when it is determined in the checking step that the printed condition of the barcode is defective.

16. The method according to claim 15, wherein a print head in said printing unit comprises a head for ejecting ink.

17. The method according to claim 16, wherein said print head comprises a head for ejecting ink by heat energy.

18. The method according to claim 15, wherein said printing unit comprises a print head having a length corresponding to a width of a printing medium, and prints a barcode in a direction perpendicular to a convey direction of the printing medium, and said checking unit reads the barcode in the direction perpendicular to the convey direction of the printing medium.

19. The method according to claim 15, wherein the information set in the setting step includes the number of times of reading in said checking unit.

20. The method according to claim 15, wherein the checking step of said checking unit includes the step of checking the barcode by checking if a barcode normal reading ratio with respect to the number of times of reading is not less than a predetermined value.

21. The system according to claim 15, wherein said printing unit includes transmitting means for transmitting information related to a barcode to be printed to said checking unit.

22. The system according to claim 21, wherein said information includes at least one of the type of barcode to be printed, the number of barcodes, or a value obtained when the barcode is decoded normally.

23. The system according to claim 21, wherein said printing unit further comprises setting means for setting information used for checking the barcode, wherein said transmitting means transmits information set by said setting means to said checking unit.

24. The system according to claim 23, wherein the information set by said setting means includes the number of reading times by said checking unit.

25. The system according to claim 24, wherein said checking means determines that the printed condition is defective if a ratio with respect to the number of times of reading is less than a predetermined value.

26. The system according to claim 25, wherein said setting means sets information said ratio used for checking the printed condition of the barcode.

27. The system according to claim 15, wherein said checking means determines that the printed condition of the barcode is effective if a ratio with respect to the number of times of reading is larger than a predetermined value.

28. The system according to claim 15, wherein said printing unit and said checking unit are enclosed in a body.

29. A barcode printing system comprising:
a printing unit for printing a barcode; and
a checking unit which operates independently of said printing unit and checks the barcode by scanning a light beam on the printed barcode,
said printing unit comprising:
a printing head for printing an image on a recording medium;
conveying means for conveying the recording medium;
print control means for, on a basis of inputted barcode data, controlling said print head so as to print a barcode image; and
control means for performing error processing in a case where an error signal is received from said checking unit, and
said checking unit comprising:
reading means provided on the convey path of said conveying means, for reading optically the barcode image printed on the recording medium, one end of said reading means being fixed at an axis and said reading means being rotatable with regard to the axis so that the reading angle can be changed;
reading control means for controlling the rotation of said reading means on the basis of the conveying condition of said conveying means;
checking means for reading the printed barcode by said reading means, and checking whether or not the barcode is defective, on a basis of the result of decoding the read barcode, and
informing means for outputting said error signal to said printing unit in a case where said checking means determines that the barcode is defective.

30. The system according to claim 29, wherein a print head in said printing unit comprises a head for ejecting ink.

31. The system according to claim 30, wherein said print head comprises a head for ejecting ink by heat energy.

32. The system according to claim 29, wherein said reading means includes means for adjusting the scanning angle on the basis of a convey speed of the printing medium on which the barcode is printed, and a scanning speed of the light beam.

33. The system according to claim 29, wherein said printing unit comprises a print head having a length corresponding to a width of a printing medium, and prints a barcode in a direction perpendicular to a convey direction of the printing medium.

34. The system according to claim 29, wherein the information set by said setting means includes the number of times of reading and the scanning angle in said checking unit.

35. The system according to claim 29, wherein said checking means in said checking unit checks the barcode by checking if a barcode normal reading ratio with respect to the number of times of reading is not less than a predetermined value.

36. The system according to claim 29, wherein said printing unit includes transmitting means for transmitting information related to a barcode to be printed to said checking unit.

37. The system according to claim 36, wherein said information includes at least one of the type of barcode to be printed, the number of barcodes, or a value obtained when the barcode is decoded normally.

38. The system according to claim 36, wherein said printing unit further comprises setting means for setting information used for checking the barcode, wherein said transmitting means transmits information set by said setting means to said checking unit.

39. The system according to claim 38, wherein the information set by said setting means includes the number of reading times by said checking unit.

40. The system according to claim 39, wherein said checking means determines that the printed condition is defective if a ratio with respect to the number of times of reading is less than a predetermined value.

41. The system according to claim 40, wherein said setting means sets information said ratio used for checking the printed condition of the barcode.

42. The system according to claim 29, wherein said checking means determines that the printed condition of the barcode is effective if a ratio with respect to the number of times of reading is larger than a predetermined value.

43. The system according to claim 29, wherein said printing unit and said checking unit are enclosed in a body.

44. A method of controlling a barcode printing system comprising:
a printing step for printing a barcode; and
a checking step which operates independently of said printing unit and checks the barcode by scanning a light beam on the printed barcode,
said printing step comprising:
a printing step for printing an image on a recording medium;
a conveying step for conveying the recording medium along a conveyor;
a print control step for, on the basis of inputted barcode data, controlling said print step so as to print a barcode image; and
a control step of performing error processing in a case where an error signal is received from said checking unit, and
said checking step comprising:
a reading step for optically reading the barcode image printed on the recording medium, by using a reading means provided on the convey path of said conveyor, one end of said reading means being fixed at an axis and said reading means being rotatable with regard to the axis so that the reading angle can be changed, wherein in the reading step, the printed barcode is read by the reading means a plurality of times;
a reading control step for controlling the rotation of said reading means on the basis of the conveying condition of said conveyor;
a determining step for determining whether or not the barcode is defective, on the basis of the result of decoding the read barcode; and
an informing step of outputting said error signal to said printing unit when it is determined in the determining step that the barcode is defective.

45. The method according to claim 44, wherein a print head in said printing unit comprises a head for ejecting ink.

46. The method according to claim 45, wherein said print head comprises a head for ejecting ink by heat energy.

47. The method according to claim 44, wherein the adjustment step includes the step of adjusting the scanning angle on the basis of a convey speed of the printing medium on which the barcode is printed, and a scanning speed of the light beam.

48. The method according to claim 44, wherein said printing unit comprises a print head having a length corresponding to a width of a printing medium, and prints a barcode in a direction perpendicular to a convey direction of the printing medium.

49. The method according to claim 44, wherein the information set in the setting step includes the number of times of reading and the scanning angle in said checking unit.

50. The method according to claim 44, wherein the checking step of said checking unit includes the step of checking the barcode by checking if a barcode normal reading ratio with respect to the number of times of reading is not less than a predetermined value.

51. The system according to claim 44, wherein said printing unit includes transmitting means for transmitting information related to a barcode to be printed to said checking unit.

52. The system according to claim 51, wherein said information includes at least one of the type of barcode to be printed, the number of barcodes, or a value obtained when the barcode is decoded normally.

53. The system according to claim 51, wherein said printing unit further comprises setting means for setting information used for checking the barcode, wherein said transmitting means transmits information set by said setting means to said checking unit.

54. The system according to claim 53, wherein the information set by said setting means includes the number of reading times by said checking unit.

55. The system according to claim 54, wherein said checking means determines that the printed condition is defective if a ratio with respect to the number of times of reading is less than a predetermined value.

56. The system according to claim 55, wherein said setting means sets information said ratio used for checking the printed condition of the barcode.

57. The system according to claim 44, wherein said checking means determines that the printed condition of the barcode is effective if a ratio with respect to the number of times of reading is larger than a predetermined value.

58. The system according to claim 44, wherein said printing unit and said checking unit are enclosed in a body.

* * * * *